(12) United States Patent
Davis Jones et al.

(10) Patent No.: US 9,606,996 B2
(45) Date of Patent: Mar. 28, 2017

(54) ASSESSING DATA GOVERNANCE BASED ON LEVELS OF ABSTRACTION

(71) Applicant: International Business Machines Corporation, Armonk, NY (US)

(72) Inventors: Dale Davis Jones, Ocala, FL (US);
Shankar S. Kalyana, Austin, TX (US);
Gandhi Sivakumar, Bentleigh East (AU)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 14/299,125

(22) Filed: Jun. 9, 2014

(65) Prior Publication Data
US 2015/0356095 A1 Dec. 10, 2015

(51) Int. Cl.
*G06F 17/30* (2006.01)
(52) U.S. Cl.
CPC ............... *G06F 17/30082* (2013.01)
(58) Field of Classification Search
CPC .......... G06Q 10/06375; G06Q 10/067; G06Q 30/0282; G06F 17/30073; G06F 17/30079; G06F 17/30082; G06F 17/30085
USPC ............. 705/1.1, 7.11, 7.36, 7.37, 347, 348; 707/600, 603, 609, 610, 634, 662, 665, 707/690, 691, 693, 694, 770, 781
See application file for complete search history.

(56) References Cited

U.S. PATENT DOCUMENTS

| | | | | |
|---|---|---|---|---|
| 8,176,019 B2 * | 5/2012 | Brodie | ................. | G06Q 10/06 707/694 |
| 8,214,877 B1 * | 7/2012 | Grimes | ................. | G06Q 10/087 707/694 |
| 8,396,838 B2 * | 3/2013 | Brockway | ......... | G06F 17/30616 707/662 |
| 8,458,148 B2 | 6/2013 | Tahiliani et al. | | |
| 8,515,795 B2 | 8/2013 | Marrelli et al. | | |
| 8,700,437 B2 * | 4/2014 | Allen | .................. | G06Q 20/108 705/7.11 |

(Continued)

OTHER PUBLICATIONS

Ballard, et al.; "Aligning MDM and BPM for Master Data Governance, Stewardship, and Enterprise Processes"; IBM Corporation, First Edition Mar. 2013, 212 pp., © Copyright International Business Machines Corporation 2013, SG24-8059-00.

(Continued)

*Primary Examiner* — Greta Robinson
(74) *Attorney, Agent, or Firm* — Gilbert Harmon, Jr.

(57) ABSTRACT

A computer receives a request for customization of a first data domain, of an organization, to be analyzed. The computer receives selection of the first data domain and a second data domain of the organization, a first data fulfillment element, and a linkage between the first data fulfillment element and one or both of the first data domain and the second data domain. The computer generates an improved data governance policy based, at least in part, on the first data domain, the second data domain, the first data fulfillment element, the linkage, and a characteristic of the organization. The computer identifies one or more differences between a current data governance policy associated with one or both of the first data domain and the second data domain and an improved data governance policy that is associated with one or both of the first data domain and the second data domain.

20 Claims, 4 Drawing Sheets

(56) References Cited

U.S. PATENT DOCUMENTS

| | | |
|---|---|---|
| 2002/0198727 A1 | 12/2002 | Ann et al. |
| 2008/0306750 A1* | 12/2008 | Wunder .............. G06Q 10/10 705/1.1 |
| 2009/0198534 A1* | 8/2009 | Brown .............. G06Q 10/06 705/7.36 |
| 2010/0161371 A1* | 6/2010 | Cantor .............. G06Q 10/063 705/7.11 |
| 2013/0030850 A1 | 1/2013 | Marrelli et al. |
| 2013/0041796 A1 | 2/2013 | Eggert et al. |

OTHER PUBLICATIONS

Chen, et al.; "Implementing an InfoSphere Optim Data Growth Solution", Copyright IBM Corp. 2011, First Edition Nov. 2011, 528 pp., SG24-7936-00.

Fu, et al.; "Fuzzy Complex No. Aided Evaluation of Predictive Toxicology Models"; WCCI 2012 IEEE World Congress on Computational Intelligence, Jun. 10-15, 2012—Brisbane, Australia, (FUZZ-IEEE 2012), 8 pp.; IEEE; 2012.

* cited by examiner

ASSESSING DATA GOVERNANCE BASED ON LEVELS OF ABSTRACTION

FIELD OF THE INVENTION

The present invention relates generally to data governance, and more particularly to assessing the maturity of data governance practices within an organization.

BACKGROUND OF THE RELATED ART

As the amount of data that is maintained by an organization increases, effective data governance policies for each specific type of data can become increasingly complex. Different types of data can require different security, access control, encryption, and archiving requirements. With hundreds of different types of data within an organization, assessing the overall quality of data governance practices often becomes a tedious and lengthy process.

From structured to unstructured data including customer and employee data, metadata, trade secrets, e-mail, video and audio; organizations often struggle to find a way to govern data in alignment with business requirements without obstructing the free flow of information and innovation. For many organizations, data is spread across multiple, complex silos that are isolated from each other. There can be scores of redundant copies of data, and the business processes that use such data are often just as redundant and tangled. In many situations, there is little cross-organizational collaboration, with few defined governance and stewardship structures, roles and responsibilities. However, such organizations often want to leverage information for maximum performance and profit. They may want to assess the value of data as a balance sheet asset, and to calculate risk in all aspects of their operations as a competitive advantage in decision-making.

SUMMARY

Embodiments of the present invention disclose a method, system, and computer program product for assessing data governance practices within an organization. A computer receives a request for customization of a first data domain, of an organization, to be analyzed. The computer receives selection of the first data domain and a second data domain of the organization, a first data fulfillment element, and a linkage between the first data fulfillment element and one or both of the first data domain and the second data domain. The computer generates an improved data governance policy based, at least in part, on the first data domain, the second data domain, the first data fulfillment element, the linkage, and a characteristic of the organization. The computer identifies one or more differences between a current data governance policy associated with one or both of the first data domain and the second data domain and an improved data governance policy that is associated with one or both of the first data domain and the second data domain.

DETAILED DESCRIPTION

Data governance is a quality control discipline for adding new rigor and discipline to the process of managing, using, improving and protecting organizational information. Effective data governance can enhance the quality, availability and integrity of data of an organization by fostering cross-organizational collaboration and structured policy-making.

The present invention will now be described in detail with reference to the Figures.

Figure 1:
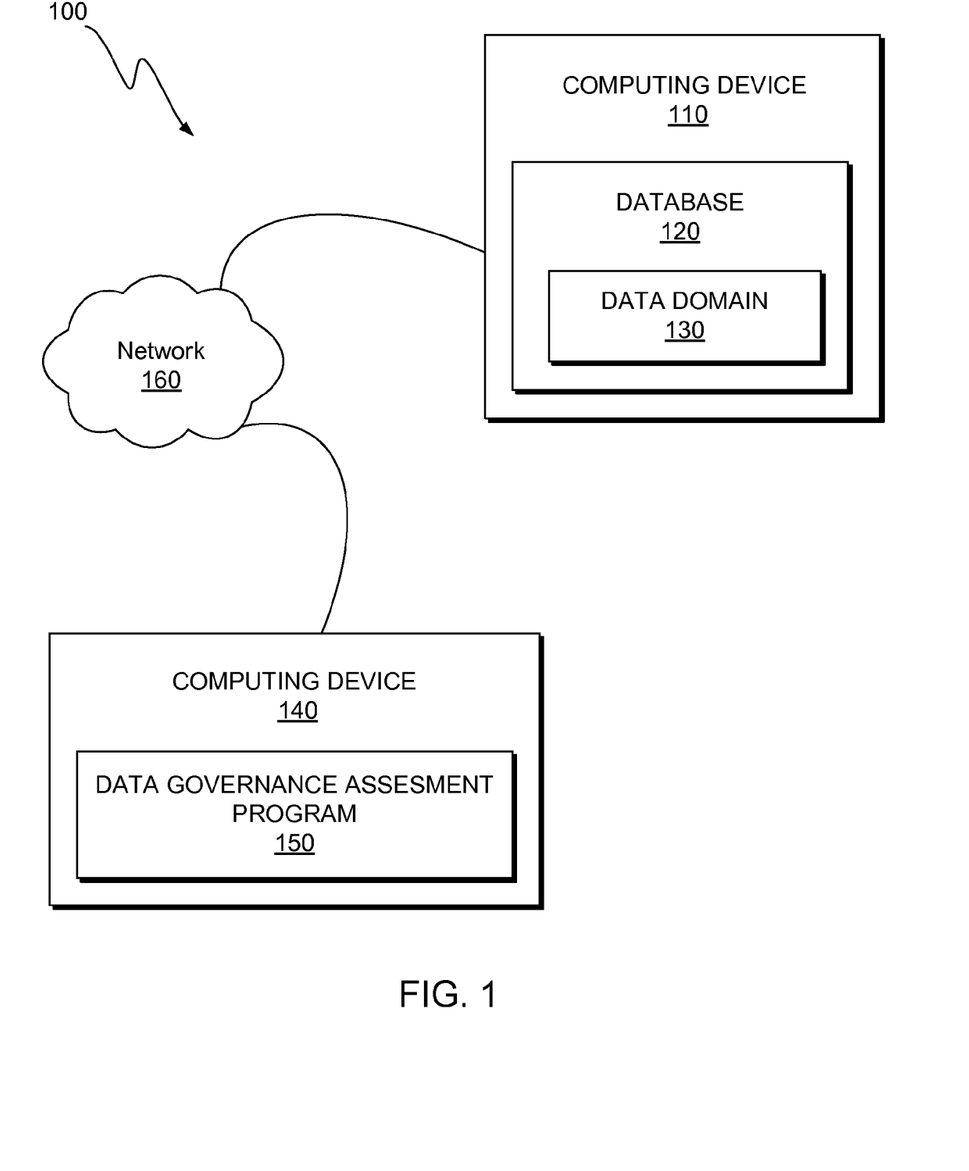
FIG. 1 is a functional block diagram illustrating a distributed computing environment, in accordance with an embodiment of the present invention.

FIG. 1 is a functional block diagram illustrating a distributed computing environment, generally designated 100, in accordance with one embodiment of the present invention. Distributed computing environment 100 includes computing device 110 and computing device 140 interconnected over network 160. Computing device 110 includes database 120 and data domain 130. Computing device 140 includes data governance assessment program 150.

In this embodiment, data governance assessment program 150 is stored on computing device 140. However, in other embodiments, data governance assessment program 150 is stored on computing device 110 along with database 120 and data domain 130.

In one embodiment, database 120, data domain 130, and data governance assessment program 150 are stored on computing devices 110 and 140. However, in other embodiments, database 120, data domain 130, and data governance assessment program 150 are stored externally and accessed through a communication network such as network 160. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 110, computing device 140, database 120, data domain 130, and data governance assessment program 150, in accordance with a desired embodiment of the present invention.

In various embodiments of the present invention, computing devices 110 and 140 can be servers, laptop computers, tablet computers, netbook computers, personal computers (PCs), or desktop computers. In another embodiment, computing devices 110 and 140 represent computing systems utilizing clustered computers and components to act as a single pool of seamless resources. In general, computing devices 110 and 140 can be any computing devices or a combination of devices with access to database 120, data domain 130, network 160, and data governance assessment program 150 and is capable of executing data governance assessment program 150, in accordance with an embodiment of the present invention. Computing devices 110 and 140 may include internal and external hardware components, as depicted and described in further detail with respect to FIG. 4.

In an embodiment, database 120 is a database including all of the data owned by an organization. For example, in one embodiment, the organization associated with database 120 is a manufacturing company. As such, database 120 includes information related to the customers of the company, the products of a company, and the financial records of the company. In an embodiment, database 120 also includes information related to the data governance practices associated with protecting the integrity of a piece of data within database 120. In certain embodiments, these practices include some or all of practices related to access control, encryption, data fragmentation, data interface errors, or regulatory compliance.

In an embodiment, data domain 130 includes one or more data domains that respectively include subsets of the data included in database 120. The data included in each respective data domain share a common attribute, which defines, in part, the subset of the data to which they belong. For example, a first data domain includes all of the customer data within a database of an organization while a second data domain includes all of the product data. In some embodiments, the data domains included in data domain 130 are nested inside other data domains. For example, a data domain includes information related to current customers is included in a larger data domain that includes all types of customer data. In some embodiments, a given data domain can contain one or more data domains inside it, and can contain one or more nested levels of data domains. In certain embodiments, the use of nested data domains allows data governance assessment program 150 to assess the data governance practices of an organization at varying levels of abstraction. In such embodiments, the use of a subset of the data included in database 120 allows data governance assessment program 150 to perform analysis on a select area, i.e., that subset, where specific data governance practices are required.

In general, data governance assessment program 150 is a program that assesses the maturity of the data governance practices used to protect the integrity of data within a data domain such as those included in data domain 130, which is included with database 120. The maturity of data governance practices, as used herein, refers to an assessment of the processes, implementation and operation of data management policies being applied to data included in a database of an organization. If such data governance practices are, in general, optimized for the operation of the organization while protecting the integrity of data within the database, then those data governance practices are considered mature. Such maturity can be assessed using levels to represent various stages or degrees of maturity, with each level having a number of criteria that must be met before progressing to the next level. In an embodiment, data governance assessment program 150 receives information from database 120 related to the data domains included in data domain 130, into which all of the data in database 120 are organized, as well as information related to the data governance processes or policies associated with each of the data domains within database 120. In an embodiment, this information is used by data governance assessment program 150 to create an improved set of data governance policies for select data. In an embodiment, data governance assessment program 150 creates an improved set of data governance policies based on aspects and characteristics of the data being analyzed, such as the type of data, date of creation etc., and the data governance requirements for that data. An improved set of data governance policies are, as used herein, generally referred to as a "governance metric".

In this embodiment, data governance assessment program 150 assesses the maturity of data governance policies of an organization by comparing the data governance policies received from database 120 to the improved data governance policies generated by data governance assessment program 150. In this embodiment, data governance assessment program 150 also generates reports detailing any gaps found between the current data governance policies and the improved data governance policies. In certain embodiments, this type of analysis is used by data governance assessment program 150 for both current environments for data management, which are, as used herein, referred to as "as-is environments", and a future environment for data management that does not yet exist, which are, as used herein, referred to as a "to-be environment.

In certain embodiments, such an analysis of to-be environments allows data governance assessment program 150 to predict the effect that a change will have on data governance before that change is made. For example, a to-be environment could include the current environment with the modification of having an additional security measure put in place, such as an access control restriction or the use of encryption. In another scenario, a to-be environment is an environment based on the current environment including a re-structuring of one or more data domains. For example, in an embodiment, a to-be environment is an environment where present customer data and former customer data are stored within the same data domain, and are protected by the same set of data governance practices.

Figure 2:
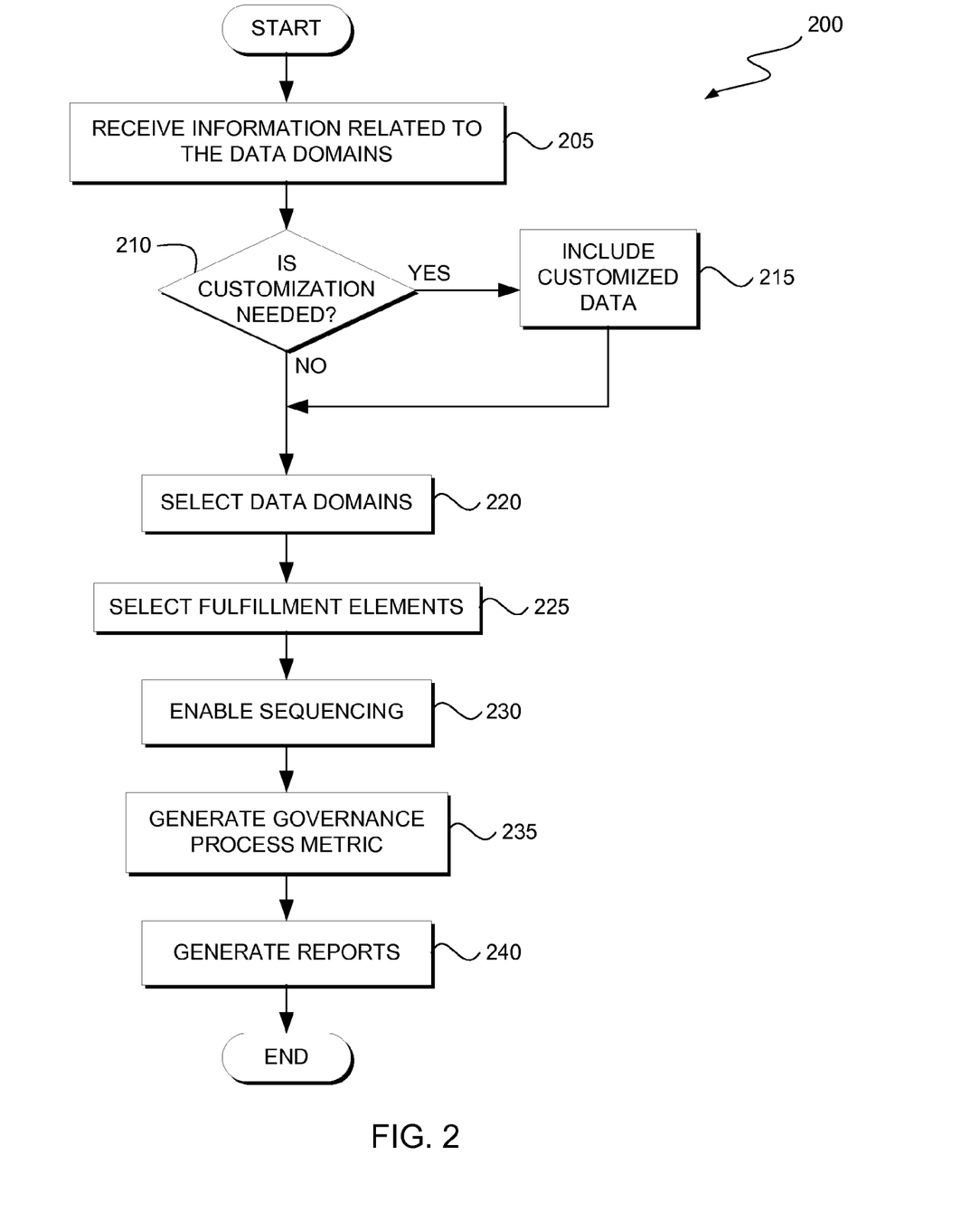
FIG. 2 is a flowchart depicting operational steps of a task optimization program, on a computing device within the distributed computing environment of FIG. 1, in accordance with an embodiment of the present invention.

FIG. 2 is a flowchart, 200, depicting operational steps of data governance assessment program 150, executing on computing device 140 within the distributed computing environment of FIG. 1, in accordance with an embodiment of the present invention. More specifically, flowchart 200 depicts operational steps of data governance assessment program 150 for determining the maturity level of the data governance practices of an organization and generating a report detailing the assessed maturity level of the data governance practices, in accordance with an embodiment of the present invention.

In step 205, data governance assessment program 150 receives information related to the data domains within database 120. The information received in step 205 includes a list of all the data domains present within database 120 as well as one or more data governance policies related to those respective data domains. In some embodiments, data governance assessment program 150 presents this information to the user in the form of a choice of possible data domains to be analyzed by data governance assessment program 150.

In decision step 210, data governance assessment program 150 determines if customization of the received domains is required. Customization, in this embodiment, is defined as a selection of a section of data, which does not comprise an entire data domain by itself, to assess the data governance policies related to that section of data. In some embodiments, data governance assessment program 150 determines that customization is required based on a user request for customization. For example, data domain A of organization Z includes sections of data 1 through 12 . Organization Z wishes to assess the data governance policies related to sections 3-5 of the data included in data domain A. Therefore, organization Z submits a request to assess the data governance policies related to sections 3-5 . Data governance assessment program 150 determines, based on the request, that organization Z wishes to customize the assessment of the data governance policies related to sections 3-5 and selects only sections 3-5 of the data included in data domain A for assessment. In some embodiments, data governance assessment program 150 automatically determines whether customization of the received domains is required based on the data having such a structure, e.g., for nested levels of data domains (see discussion of FIG. 3 for more details regarding nested levels). For example, data domain Y has data with a type of structure, Z', which necessitates the use of customization. As such, data governance assessment program 150 identifies the structure of that data as being Z' and, in response, determines that customization is required for data domain Y.

In some embodiments, data governance assessment program 150 automatically determines that customization is required based on a variety of governance practices that are associated with a given domain. In some embodiments, data governance assessment program 150 is configured to analyze a data domain to determine the variety of data governance policies included in that data domain, i.e., the number and type of data governance policies included in that data domain. In such embodiments, if data governance assessment program 150 determines that the variety of data governance policies, included in the data domain, are above a pre-determined threshold, then data governance assessment program 150 determines that customization is required. For example, data governance assessment program 150 analyses a data domain including product information and that data domain is determined, by data governance assessment program 150, to include purchase orders for common household items, which are protected by minor regulations. However, data governance assessment program 150 also determines that the data domain includes a proprietary design for an upcoming product that is subject to strict access control policies. As such, data governance assessment program 150, automatically determines that customization is required for that data domain based on the variety of governance practices included within the domain, i.e., the minor regulations and the strict access control policies, and that such customization will be directed via user input. Therefore, in this example, data governance assessment program 150 flags that data domain to indicate that customization is required and that such customization will be directed via user input.

In other embodiments, if data governance assessment program 150 determines that a variety of data governance policies are included in a data domain, then data governance assessment program 150 uses a set of rules to determine whether customization is to be applied. For example, certain data domains are allowed to include multiple governance practices and as such, data governance assessment program 150 includes a set of rules that dictate how data governance assessment program 150 is to determine the need for customization. Additionally, in certain embodiments, if a user wishes to evaluate the data governance maturity of a to-be environment, which includes changes that have not been made yet, then data governance assessment program 150 presents the creation of a to-be environment to the user as a type of selectable customization that is associated with the data domains included in the to-be environment.

If data governance assessment program 150 determines that customization of the received domains is needed (decision step 210, yes branch), then data governance assessment program 150 includes the customized data domains at the appropriate levels, in step 215. As part of including the customized data domains at the appropriate levels, data governance assessment program 150 generates a set of details regarding the customization of those domains, as indicated in by the processes and results of decision step 210. In some embodiments, the inclusion of a customized domain at an appropriate level, as used herein, refers to replacing the details of a given domain, as they were received from database 120 in step 205, with the details regarding the customization of that same domain. In other embodiments, the inclusion of a customized domain at an appropriate level includes the inclusion of only a part of the details regarding the customization of that same domain. In yet other embodiments, the inclusion of a customized domain at an appropriate level includes the inclusion of other data in addition to the details regarding the customization of that same domain. For example, such other data includes records that indicate that a type of customization was applied to a particular data domain on a specified date.

In this embodiment, if data governance assessment program 150 determines that customization of the received domains is not needed (decision step 210, no branch), then data governance assessment program 150 proceeds to step 220. In step 220 data governance assessment program 150 receives a selection of the data domains to be analyzed by data governance assessment program 150. In some embodiments, data governance assessment program 150 receives a selection of such data domains from the user. In other embodiments, data governance assessment program 150 selects such data domains based on data governance assessment program 150 determining that customization of the received domains is needed. In this embodiment, such selected data domains include at least one of: a) a data domain that was customized in decision step 210, b) a data domain as received from database 120 in step 205, or c) one or more to-be environments in which the user specifies changes to be made to the current form of the data domains.

In step 225, data governance assessment program 150 receives user selection of data fulfillment elements and linkage. In some embodiments, a data fulfillment element, as used herein, refers to a specific data governance policy that is to be evaluated by data governance assessment program 150. In one embodiment, a data fulfillment element includes at least one of: access control, encryption, data fragmentation, data interface errors, regulatory compliance, data replication, data archiving, data consolidation, or a metric used to evaluate or improve the integrity of a database or amount of data. A linkage, as used herein, refers to the property of linking a data domain with a data fulfillment element to evaluate on that domain. In one embodiment, linkage describes evaluating data encryption policies based on a set of four selected domains, but only evaluating access control policies on a single data domain out of the four selected data domains. Other examples of such linkages would be known and understood to a person having ordinary skill in the art.

In step 230, data governance assessment program 150 reduces the time required to evaluate at least some of the data fulfillment elements and data domains by sequencing the evaluation of specific data fulfillment elements and data domains. In this embodiment, data governance assessment program 150 increases the number of data fulfillment elements and data domains that are analyzed in a given time period. For example, a data security breach has occurred for a database and information is required as soon as possible to evaluate the breach and secure the system from future breaches. However, the database that was breached contains a large amount of data in many data domains and certain data governance analysis results are required before the full analysis is completed. In this example, certain data domains and data fulfillment elements must be evaluated more quickly than others in order to evaluate the breach and secure the system from future breaches. As such, data governance assessment program 150 places the data domains and data fulfillment elements into a sequence for analysis such that those certain data domains and data fulfillment elements, which need to be evaluated more quickly, are evaluated first. In this example, such an organization of data domains and data fulfillment elements and subsequent analysis provides feedback sooner than would be possible otherwise.

In step 235, data governance assessment program 150 generates the governance process metric based on an improved set of data governance policies as well as the current set of data governance policies included in database 120. In an embodiment, the governance process metric includes an improved implementation of each data fulfillment element of the domain selected for analysis. Improved data governance policies are generated for each selected data fulfillment element based on characteristics of the organization, the characteristics of the data domains being analyzed, the structure of the data domains being analyzed and the sequence of data fulfillment elements for analysis. In some embodiments, data governance assessment program 150 generates a governance process metric independently for each data domain that is analyzed by.

In step 240, data governance assessment program 150 generates a report that describes the maturity of the data governance policies related to the data domains within database 120. In an embodiment, such reports describe differences between the improved data governance practices, generated in step 235, and the current data governance practices, as received from database 120 in step 205. In one embodiment, such differences include an identified difference between a current data governance policy as received from database 120, in step 205, and a governance process metric that was generated in step 235. In some embodiments, generated reports include priority areas describing one or more gaps with a level of importance above a pre-determined threshold. In other embodiments, data governance assessment program 150 determines priority areas based on a gap related to a specific data domain or data fulfillment element which is determined to represent a higher risk or importance. For example, in a case of a security breach on a single data domain, any identified gap related to the domain which was compromised is automatically determined to be a priority area. Similarly, if there is a suspected issue with a specific data fulfillment element such as encryption, any gap related to encryption is determined to be a priority area. In some embodiments, data governance assessment program 150 uses priority areas to report the most urgent data governance errors, which require immediate action and resolution. In other embodiments, data governance assessment program 150 uses priority areas to report an identified difference between a current data governance policy and a governance process metric.

In some embodiments, data governance assessment program 150 repeats the process of creating reports for a specified to-be environment. For example, if more than one to-be environment was specified in step 220, then the report creation process is repeated once for each to-be environment specified. When data governance assessment program 150 repeats the report creation process, a report is generated, by data governance assessment program 150, which identifies gaps between the data governance processes included in the to-be environment, and the governance process metric generated in step 235. In some embodiments, in order to show the effect on overall data governance maturity that a given change will have, a report is created for a to-be environment that compares and contrast the differences between the to-be environment and an as-is environment and the effects those differences will cause.

Figure 3:
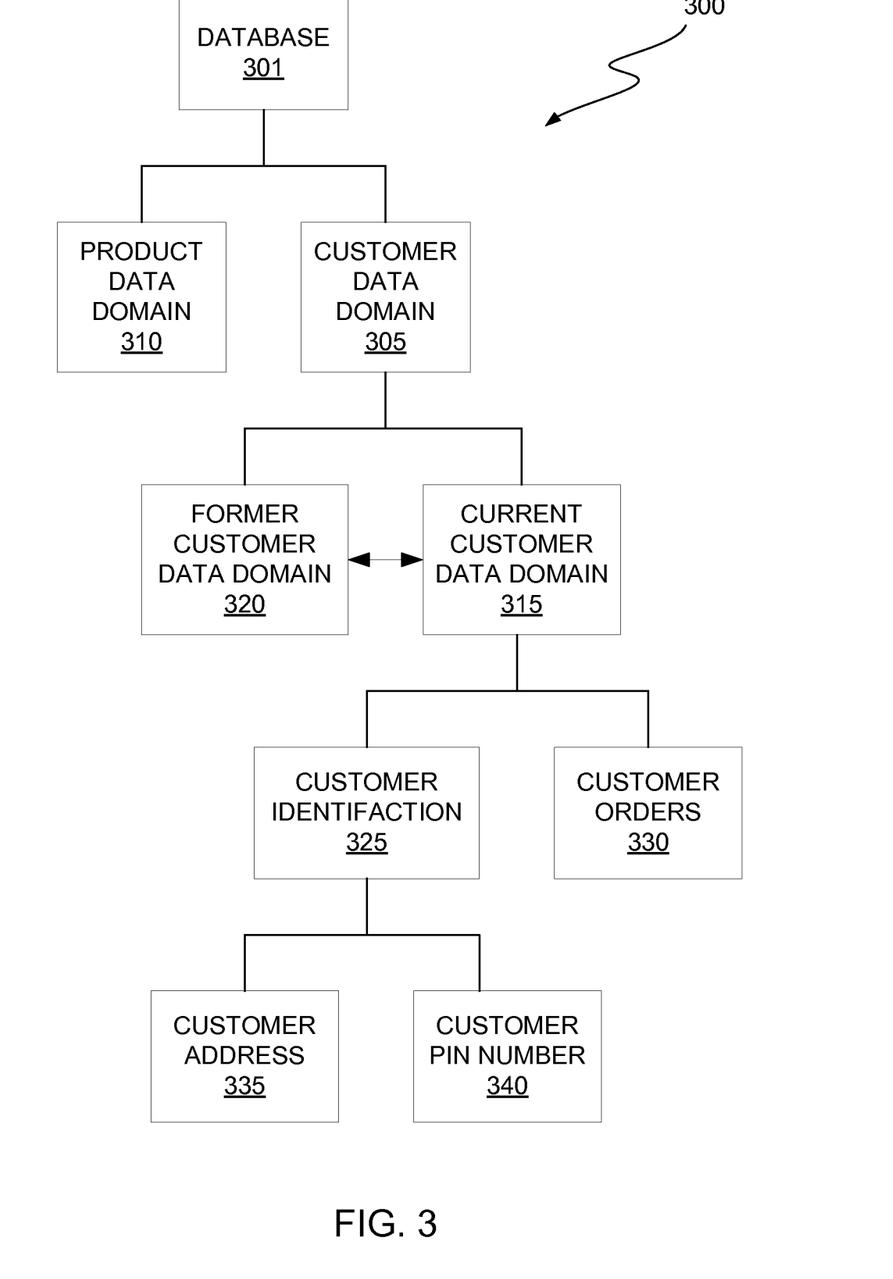
FIG. 3 is a block diagram depicting an exemplary structure of a database divided into data domains, in accordance with an embodiment of the present invention.

FIG. 3 depicts a block diagram, generally designated 300, of an exemplary data domain structure within a database, denoted as database 301, in accordance with an embodiment of the present invention. In general, block diagram 300 is intended to illustrate the organization of data included in a data domain structure within database 301. As such, various data domains are shown with line connections to indicate the various sub-sets of data included within each respective data domain.

In this example, at the highest level of abstraction, two data domains exist, i.e., two top-level data domains exist. In this example, the top-level data domains of database 301 are customer data domain 305 and product data domain 310. These two data domains include all data related to the customers and products of an organization, i.e., all of the data included in database 301.

In this example, customer data domain 305 is illustrated as including several data domains with each respectively including one or more sub-sets of data that are included in customer data domain 305. Conversely, product data domain 310 includes no other data domains. However, in other embodiments, one or more data domains may exist within a given top-level data domain, such as product data domain 310, including one or more nested levels of data domains. As such, in some embodiments, a data domain includes one or more data domains within itself.

In this example, customer data domain 305 includes current customer data domain 315 and former customer data domain 320. Current customer data domain 315 includes information related to customers which are currently doing business with the organization, which owns database 301. Former customer data domain 320 includes information related to customers who no longer do business with the organization and, as a result, serves as an archive for past business transactions and customer information. The data included in current customer data domain 315 and former customer data domain 320 is exchangeable, which is indicated using a double headed arrow in FIG. 3. For example, a customer no longer wishes to continue doing business with the organization. As such, their data is moved from current customer data domain 315 to former customer data domain 320. In another example, a former customer included in former customer data domain 320 returns as an active customer. Therefore the data for that customer is moved from former customer data domain 320 to current customer data domain 315. Current customer data domain 315 and former customer data domain 320 each include a set of data governance policies that describe how the data respectively contained in current customer data domain 315 and former customer data domain 320 is controlled, managed, and accessed. In this embodiment, as a result of the property of inheritance, and due to the fact that both current customer data domain 315 and former customer data domain 320 are contained in customer data domain 305, current customer data domain 315 and former customer data domain 320 include one or more data governance policies or attributes from customer data domain 305. In this embodiment, information related to current customers is determined to be more sensitive than information related to former customers. As such, due to differences in sensitivity of the included information, current customer data domain 315 either includes one or more data governance policies in addition to those inherited from customer data domain 305, or excludes a data governance policy from the set of data governance policies inherited from customer data domain 305.

In some embodiments, data governance assessment program 150 performs an action based on a specific trigger such as an event related to the data included in a database, such as database 301 or database 120. In one embodiment, a trigger is defined by no records for a given customer within current customer data domain 315 being accessed for a year or more. In one embodiment, the trigger being present causes the records to be flagged so that appropriate action such as adding an additional data governance policy or moving the records to another data domain can be taken at a later date. In general, a trigger is a criteria that, if met, causes a change to be made to the manner in which a portion of data is managed, e.g., handled, classified, etc. In other embodiments, data governance assessment program 150 performs an action such as moving a record into an appropriate data domain automatically in response to the presence of a trigger. For example, in the case of a record not being accessed for a year or more, the record is moved from current customer data domain 315 to former customer data domain 320 due to the inactivity of the customer. In this embodiment, moving a record into a new data domain causes the record to inherit all of the data governance policies from the new data domain in which it is contained.

Current customer data domain 315 includes customer identification data domain 325 and customer orders data domain 330. In certain alternative embodiments, former customer data domain 320 includes similar data domains to customer identification data domain 325 and customer orders data domain 330. In certain alternative embodiments, customer identification data domain 325 and customer orders data domain 330 include one or more data governance policies from current customer data domain 315 as a result of the property of inheritance.

At the lowest level of abstraction in this example, customer identification data domain 325 includes customer address data domain 335 and customer pin number data domain 340. In this example, because customer address data domain 335 and customer personal identification number (PIN) number data domain 340 are separate data domains with each data domain including its own respective specific set of data governance practices. For example, customer address data domain 335 includes only information which is readily available to the public, and as such, customer address data domain 335 does not include any data governance policies related to access control. In this embodiment, customer PIN number data domain 340 includes extremely sensitive data which would result in a security breach if not properly controlled. As a result, customer PIN number data domain 340 includes a set of data governance policies related to data security, encryption, and access control.

Figure 4:
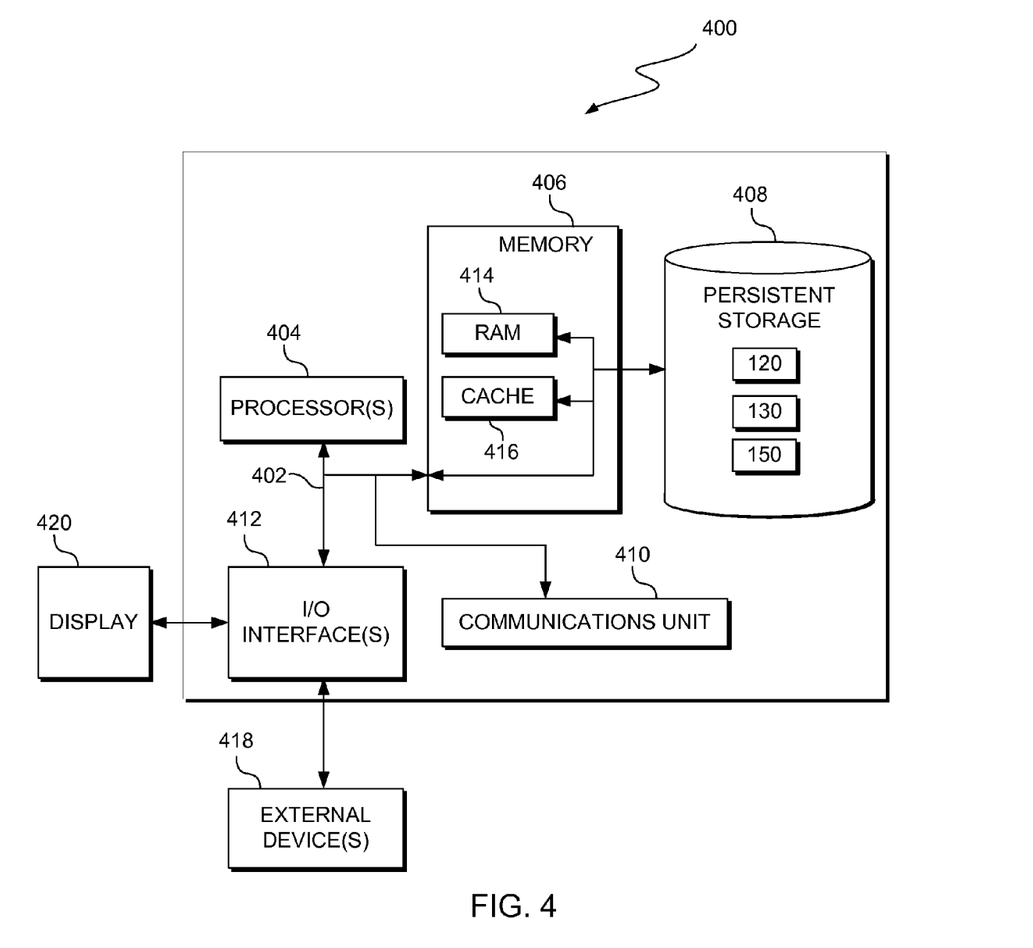
FIG. 4 depicts a block diagram of components of the computing device executing the task optimization program, in accordance with an embodiment of the present invention.

FIG. 4 depicts a block diagram, 400, of respective components of computing device 110 and computing device 140, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Computing device 110 and computing device 140 respectively include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Database 120, data domain 130 and data governance assessment program 150 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of network 160. In these examples, communications unit 410 includes one or more network interface cards. Communications unit 410 may provide communications through the use of either or both physical and wireless communications links. Database 120, data domain 130 and data governance assessment program 150 may be downloaded to persistent storage 408 through network 160.

I/O interface(s) 412 allows for input and output of data with other devices that may be connected to computing device 110 and computing device 140. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., data governance assessment program 150, database 120, and data domain 130, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:
1. A method for assessing domain-based data governance practices within an organization, the method comprising:
  receiving, by a computer processor, a request for customization of a first data domain, of an organization, to be analyzed;

receiving, by the computer processor, selection of the first data domain and a second data domain of the organization wherein the first data domain is nested inside the second data domain, a first data fulfillment element, and a linkage between the first data fulfillment element and both the first data domain and the second data domain;

generating, by the computer processor, a new data governance policy based, at least in part, on the first data domain, the second data domain, the first data fulfillment element, the linkage, and a characteristic of the organization; and identifying, by the computer processor, one or more differences between a current data governance policy included with both the first data domain and the second data domain and the new data governance policy that is included with both the first data domain and the second data domain.

2. The method of claim 1, the method further comprising:
receiving, by the computer, a sequence of one or more data fulfillment elements and data domains in which a data governance maturity of the selected data domains is evaluated.

3. The method of claim 1, the method further comprising:
receiving, by the computer, a request for evaluation of a data governance maturity of a first environment for data management, wherein the first environment comprises a desired future state of a second environment for data management that includes at least one selected from the group consisting of: the first data domain, the second data domain, the first data fulfillment element, the linkage, and a characteristic of the organization; and generating, by the computer, a report identifying one or more identified differences between the data governance maturity of an second environment for data management and the first environment for data management, wherein the second environment for data management comprises the current state of the environment for data management.

4. The method of claim 1, wherein a data fulfillment element includes at least one selected from the group consisting of: a required degree of access control, a type of required encryption, an allowable degree of data fragmentation, an allowable number of data interface errors, a rule regarding regulatory compliance, a required type of data replication, a degree of required data retention, a type of data archiving to be used, and a type of data consolidation to be used.

5. The method of claim 1, wherein a data domain comprises a subset of data included in a database, and wherein a data is included in the subset of data based on the data having one or both of an attribute or a data governance requirement that defines, at least in part, the data that is included in the subset of data.

6. The method of claim 1, the method further comprising:
generating, by the computer, one or more priority areas based, at least in part, on a level of importance of the identified difference between the current data governance policy and the new data governance policy.

7. The method of claim 1, the method further comprising:
receiving, by the computer, an indication that a criteria has been met, wherein meeting the criteria dictates that data management of at least a portion of data included in the first data domain is to be modified; and
performing, by the computer, an action to the portion of data based, at least in part, on the criteria being met, wherein the action causes a change to be made in data management of the portion of data.

8. A computer program product for assessing domain-based data governance practices within an organization, the computer program product comprising:
one or more computer-readable storage media and program instructions stored on the one or more computer-readable storage media, the program instructions to perform a method, the method comprising:
receiving, by a computer, a request for customization of a first data domain, of an organization, to be analyzed;
receiving, by the computer, selection of the first data domain and a second data domain of the organization wherein the first data domain is nested inside the second data domain, a first data fulfillment element, and a linkage between the first data fulfillment element and both the first data domain and the second data domain;
generating, by the computer, an improved data governance policy based, at least in part, on the first data domain, the second data domain, the first data fulfillment element, the linkage, and a characteristic of the organization; and
identifying, by the computer, one or more differences between a current data governance policy associated with both the first data domain and the second data domain and an improved data governance policy that is associated with both the first data domain and the second data domain.

9. The computer program product of claim 8, the method further comprising:
receiving, by the computer, a sequence of one or more data fulfillment elements and data domains in which to evaluate a data governance maturity of the selected data domains.

10. The computer program product of claim 8, the method further comprising:
receiving, by the computer, a request for evaluation of a data governance maturity of a to-be environment, wherein the to-be environment comprises a desired future state of an environment; and
generating, by the computer, a report identifying one or more identified differences between the data governance maturity of an as-is environment and the to-be environment, wherein the as-is environment comprises the current state of the environment.

11. The computer program product of claim 8, wherein a data fulfillment element includes at least one of: a required degree of access control, a type of required encryption, an allowable degree of data fragmentation, an allowable number of data interface errors, a rule regarding regulatory compliance, a required type of data replication, a degree of required data retention, a type of data archiving to be used, or a type of data consolidation to be used.

12. The computer program product of claim 8, wherein a data domain comprises a subset of data included in a database, and wherein the data of the subset of data shares one or both of a common attribute or a data governance requirement.

13. The computer program product of claim 8, the method further comprising:
generating, by the computer, one or more priority areas based, at least in part, on the level of importance of an identified difference between the current data governance policy and the improved data governance policy.

14. The computer program product of claim 8, the method further comprising:
- receiving, by the computer, a trigger comprising an event related to the first data domain; and
- performing, by the computer, an action related to a subset of data within the first data domain based, at least in part, on the trigger.

15. A computer system for assessing domain-based data governance practices within an organization, the computer system comprising:
- one or more computer readable storage media; and
- a processor in communication with the one or more computer readable storage media, wherein the computer system is configured to perform a method, said method comprising:
  - receiving, by a computer, a request for customization of a first data domain, of an organization, to be analyzed;
  - receiving, by the computer, selection of the first data domain and a second data domain of the organization wherein the first data domain is nested inside the second data domain, a first data fulfillment element, and a linkage between the first data fulfillment element and both the first data domain and the second data domain;
  - generating, by the computer, an improved data governance policy based, at least in part, on the first data domain, the second data domain, the first data fulfillment element, the linkage, and a characteristic of the organization; and
  - identifying, by the computer, one or more differences between a current data governance policy associated with both the first data domain and the second data domain and an improved data governance policy that is associated with both the first data domain and the second data domain.

16. The computer system of claim 15, the method further comprising:
- receiving, by the computer, a sequence of one or more data fulfillment elements and data domains in which to evaluate a data governance maturity of the selected data domains.

17. The computer system of claim 15, the method further comprising:
- receiving, by the computer, a request for evaluation of a data governance maturity of a to-be environment, wherein the to-be environment comprises a desired future state of an environment; and
- generating, by the computer, a report identifying one or more identified differences between the data governance maturity of an as-is environment and the to-be environment, wherein the as-is environment comprises the current state of the environment.

18. The computer system of claim 15, wherein a data fulfillment element includes at least one of: a required degree of access control, a type of required encryption, an allowable degree of data fragmentation, an allowable number of data interface errors, a rule regarding regulatory compliance, a required type of data replication, a degree of required data retention, a type of data archiving to be used, or a type of data consolidation to be used.

19. The computer system of claim 15, wherein a data domain comprises a subset of data included in a database, and wherein the data of the subset of data shares one or both of a common attribute or a data governance requirement.

20. The computer system of claim 15, the method further comprising:
- receiving, by the computer, a trigger comprising an event related to the first data domain; and
- performing, by the computer, an action related to a subset of data within the first data domain based, at least in part, on the trigger.

* * * * *